No. 878,305. PATENTED FEB. 4, 1908.
A. McGARY & J. W. JEPSON.
MEANS FOR MOUNTING AND DRIVING DYNAMOS FOR ELECTRIC CAR LIGHTING.
APPLICATION FILED NOV. 18, 1905.
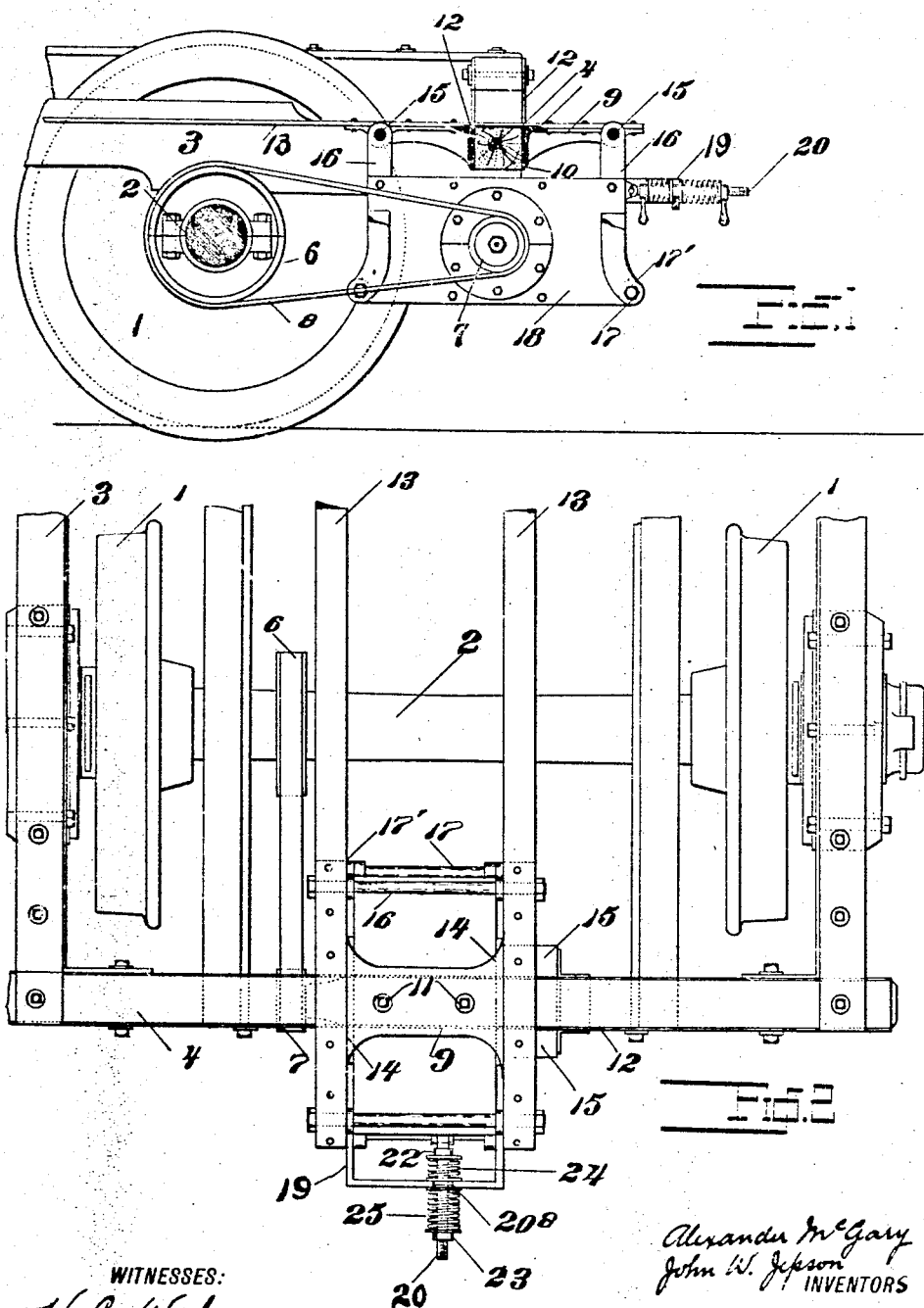

UNITED STATES PATENT OFFICE.

ALEXANDER McGARY AND JOHN W. JEPSON, OF NEW YORK, N. Y., ASSIGNORS, BY DIRECT AND MESNE ASSIGNMENTS, TO BLISS ELECTRIC CAR LIGHTING COMPANY, OF MILWAUKEE, WISCONSIN, A CORPORATION OF WISCONSIN.

MEANS FOR MOUNTING AND DRIVING DYNAMOS FOR ELECTRIC-CAR LIGHTING.

No. 878,305.     Specification of Letters Patent.     Patented Feb. 4, 1908.

Application filed November 18, 1905. Serial No. 288,055.

*To all whom it may concern:*

Be it known that we, ALEXANDER MCGARY and JOHN W. JEPSON, both citizens of the United States, residing in the city, county, and State of New York, have invented new and useful Improvements in Means for Mounting and Driving Dynamos for Electric-Car Lighting and other Purposes; and in order that those skilled in the art may make and use the same we give the following description.

Our invention relates to the mounting and driving of dynamo-electric machines and is particularly concerned with means for mounting the same on railway cars or other vehicles to be driven by the wheel or axle of the vehicle.

Our invention has for its object to provide an improved construction or arrangement for mounting dynamo-electric machines on cars whereby the disadvantages and difficulties encountered in the arrangements and means hitherto known or used for this purpose are eliminated and overcome, and to provide a simple, reliable and efficient means for carrying the dynamo.

In arrangements or constructions hitherto known or used for mounting a dynamo on the car or other vehicle, the dynamo has either been mounted directly on the car body or upon the truck frame. The objections to mounting the dynamo on the car body are well known by those skilled in the art and consist principally in the fact that the pulleys or other driving means connecting the dynamo and the car axle or wheel are continually changing their relative positions either because of unevenness in the track or road or by changes in the direction of the car, as for instance, in going around curves when the car body swings in relation to the truck. For these reasons this way of mounting the dynamos is not generally adopted in practice. Where the dynamo has been carried on the truck, elaborate supporting structures have been resorted to to support and hold the same securely in position. In such cases the dynamo has been carried in one of two positions in relation to the end sill or beam of the truck. In one of these positions the dynamo has been carried inside the truck, that is, between the car axle and the end sill; in the other position the dynamo is carried outside or beyond the end beam or sill of the truck. In the former of these positions, the dynamo is very inaccessible for adjustment, inspection, etc., and the space available is limited by the truck structure and particularly by the brake mechanism so that it is not only difficult to mount the dynamo in this position but when mounted it is extremely difficult to reach the same for inspection, adjustment, regulation, etc. In the latter position, that is, where the dynamo is mounted outside the sill of the truck, greater accessibility is obtained but at the expense of elaborate supporting structures and braces carrying and supporting the dynamo. Furthermore the dynamo being removed at a distance from and outside its point of support there is great liability of sagging and getting out of alinement by reason of the jolting, shaking and twisting of the truck. Furthermore the driving connection is required to be considerably longer than where the dynamo is carried inside the truck and this gives rise to a tendency of the driving connection to fly off the pulleys.

Our invention is designed to overcome these objections and to provide a simple form of mounting whereby the dynamo is carried in the most favorable position with regard to its support and the driving connection is shortened; and wherein the dynamo is easily accessible for the purposes of inspection, repair, regulation etc.

In the accompanying drawings, we have illustrated a form of mounting embodying our invention, in which Figure 1 represents an elevation with the parts shown in section, of a wheel, axle and truck of a railroad car or similar vehicle and showing the mounting of a dynamo with respect thereto, and Fig. 2 a plan view of the same.

Referring to the drawings, 1 represents the wheels and 2 the axle of the truck; 3 represents the truck frame and 4 the end sill or beam thereof; 18 represents the dynamo, 6 a pulley secured to the axle 2 and rotating therewith; 7 represents a pulley in alinement with the pulley 6 and secured to the armature shaft of the dynamo; 8 represents a driving connection between 6 and 7. This driving connection may be a chain or a belt, preferably the former. In distinction from mounting the dynamo in the ways above referred to, we mount the dynamo so that its weight or center of gravity is vertically, or substantially so, below its place of support. Thus, in practically carrying out our invention, we support the dynamo on the end sill of the car truck so that it is carried substantially vertically beneath said sill. In the drawings we have shown a form of mounting embodying our invention, for carrying a dynamo in the position stated as follows:

A suitable saddle shaped structure or casting 9 is fitted over the end sill or beam 4, this saddle being provided with a rectangular channel or recess 10 running longitudinally and centrally of the saddle to fit the beam 4. This casting or saddle structure may be firmly secured by means of bolts 11 passing through the sill or beam 4. Plates 12 are secured to the sides of the beam 4 to assist in supporting the dynamo. Liners or strips may be inserted between the plates 12 and the sides of the recess 10 to take up any looseness of fit. The saddle is further supported by means of a pair of stay rails 13—13, the outer ends of which pass over the end sill or beam 4 and are riveted or otherwise secured to flanges formed on saddle 9. These stay rails 13—13 are preferably arranged to fit rabbeted portions 14—14 of the saddle 9. The end flanges 15 of the saddle 9 come about flush with the upper face of the beam 4, while the central portion of the saddle 9 rests over and upon said beam. The inner ends of the rails 13 may be secured to any suitable and convenient portion of the truck. By this means the supporting saddle 9 is securely held on the beam 4 and no racking or twisting occurs. On each side of the saddle 9 are formed apertures to receive rods 15—15 which may be in the nature of rock shafts, and to which are connected suspension links or arms 16—16 at each end of each shaft. Said links or arms 16—16 may be free to swing on stationary shafts 15, 15 if desired, the object being to obtain pivotal connection between said links and the saddle. In the lower ends of said links or arms 16 are carried rods 17—17 which pass through eyes 17' in the dynamo frame 18. The dynamo is thus supported from the end sill or beam 4 and can yield, to a limited extent, to the movements of the car. In order to maintain the dynamo in normal position with respect to the driving pulley 6, means are provided consisting of a yoke 19 formed on or secured to the rear links 16. A screw rod 20 is detachably connected to the dynamo and is provided with two adjusting nuts 22 and 23 threaded on the rod, the inner one 22 of which regulates the adjustment of a spring 24 and the outer one 23 of which regulates the adjustment of a spring 25. Upon proper adjustment of the screw-nuts 22—23, the driving connection may be adjusted to the required tension and through the action of the springs the adjustment is maintained throughout the movements of the car, the springs 24—25 acting to hold the dynamo in normal position. Rod 20 passes through a notch 20ª in the crosspiece of yoke 19.

By the above described arrangement and construction of mounting the dynamo, the weight of the dynamo is suspended directly beneath its place of support. This presents the advantages of eliminating all elaborate and braced supporting structures which are required when the dynamo is carried either inside or outside of the sill, the obtaining of a shorter driving connection thereby eliminating the side whip or lash of the driving chain or belt which occurs when this connection is lengthened as when the dynamo is mounted outside the sill, and the carrying of the dynamo in an easily accessible position.

In order to obtain access to the dynamo, it is only necessary to remove the nut on the lower rear rod 17, remove said rod, lift rod 20 out of the notch 20ª and allow the rear end of the dynamo to drop to the ground or to a support placed to receive it. The dynamo is thus easily accessible for repairing, inspection, regulation etc.

While I have shown and described specifically one construction by which my invention may be embodied, I do not wish to limit my invention thereby, as it will be evident to those skilled in the art that the invention is capable of being embodied in various forms, and that modifications may be made without departing from the scope and principle of the invention.

Having thus described our invention, the following is what we claim as new therein and desire to secure by Letters Patent:

1. Means for mounting a dynamo upon a car or other vehicle comprising the end sill or beam of the car truck and a frame carried by said sill or beam for supporting a dynamo directly beneath said sill or beam.

2. Means for mounting a dynamo on a car or other vehicle, comprising a car truck, a supporting frame or plate mounted upon the end sill of said truck and a dynamo carried by said frame or plate directly beneath said end sill and a driving connection from the car wheel or axle to the dynamo.

3. Means for mounting a dynamo on a car or other vehicle, comprising the end sill or beam of the car truck, a saddle plate mounted on said beam and having portions projecting laterally on each side thereof, suspension members pivotally connected to said laterally projecting portions, a dynamo machine carried by and between said suspension members and a driving connection between said dynamo and the car wheel or axle.

4. Means for mounting a dynamo upon a car or other vehicle, comprising the end sill or beam of the car truck, a saddle plate mounted upon said sill or beam and formed with a recess, the sides of which are adapted to embrace said beam, supporting links or members pivotally connected to said saddle plate on opposite sides of said plate, a dynamo machine carried by said members, and driving connection between a car wheel or axle and the dynamo.

5. Means for mounting a dynamo upon a car or other vehicle, comprising the combination with the end sill or beam of the truck, of a plate mounted on said sill or beam, a pair of stay-rails secured to said truck and projecting over said sill or beam, said plate secured to said rails on each side of the sill or beam, and a dynamo supported by said plate beneath said sill or beam.

6. Means for mounting a dynamo machine on a car or other vehicle, comprising an end sill or beam of a car truck, a supporting plate mounted on and embracing said beam, flanges formed on said plate, the upper faces of which are substantially flush with the upper face of the sill or beam, stay rails secured to said flanges, said stay rails being secured to the truck and supported on said end sill or beam and a dynamo machine suspended from said plate.

7. Means for mounting a dynamo upon a car or other vehicle comprising the combination with the end sill or beam of a car truck of a plate mounted on said sill or beam, a recessed portion formed on said plate to receive said sill or beam, flanges formed on said plate at the ends thereof and forming extensions of the recess, said flanges being substantially flush with the upper faces of said end sill or beam, and forming rabbeted portions on said plate, a pair of stay rails secured to the truck and extending over said sill or beam, said rails engaging the rabbeted portions of the plate and secured to the same by said flanges, and a dynamo suspended from said plate beneath the end sill or beam.

8. Means for mounting a dynamo upon a car or other vehicle comprising the combination with the end sill or beam of the car truck, of a supporting plate mounted on said beam, supporting links or members pivotally connected with said plate a dynamo carried by said links, a driving connection between the car wheel or axle and the dynamo, and means for maintaining the dynamo in normal position with respect to the car wheel or axle.

9. Means for mounting a dynamo upon a car or other vehicle, comprising the combination with the end sill or beam of the car truck, a plate supported on said sill or beam, supporting links or members pivotally connected with said plate, a yoke connected to said links or members, a pair of oppositely acting springs on said yoke, said springs connected to the dynamo and a driving connection between the dynamo and the car wheel or axle.

10. Means for mounting a dynamo on a car or other vehicle comprising the combination with the car truck of a frame or plate secured to the truck, suspension members connected to said frame, a dynamo carried by said members beneath the place of support on the truck, and driving connection between the dynamo and the wheels or axle of the car.

11. The combination with a cross piece of a car truck, of a dynamo arranged directly beneath said cross piece, and means movably supporting said dynamo in position.

12. The combination with a cross piece of a car truck, of a dynamo arranged directly beneath said cross piece, means movably supporting said dynamo in position, and means for adjusting the position of said dynamo.

13. The combination with the end beam of a car truck, of a dynamo arranged directly beneath said beam, and means movably supporting said dynamo from said beam.

14. The combination with the end beam of a car truck, of a dynamo arranged directly beneath said beam, and adjustable means movably supporting said dynamo from said beam.

15. The combination with the end beam of a car truck, of a dynamo arranged directly beneath said beam, adjustable means movably supporting said dynamo on said beam, and means for driving said dynamo from an axle.

16. The combination with the end beam of a car truck, of a dynamo arranged directly beneath said beam, means movably supporting said dynamo on said beam, and a belt for driving said dynamo from an axle.

17. The combination with the end beam of a car truck, of a dynamo arranged directly beneath said beam, means movably supporting said dynamo on said beam, a belt for driving said dynamo from an axle, and means for adjusting the tension of said belt.

18. The combination with the end beam of a car truck, of a dynamo arranged directly beneath said beam, and members on opposite sides of said beam for movably supporting said dynamo in position.

19. The combination with the end beam of a car truck, of a dynamo arranged directly beneath said beam, members on opposite sides of said beam for supporting said dynamo movably in position, and means of adjusting said dynamo.

20. The combination with the end beam of a car truck, of a dynamo arranged directly beneath said beam, members on opposite sides of said beam movably supporting said dynamo in position, and a belt for driving said dynamo from an axle.

21. The combination with the end beam of a car truck, of a dynamo arranged directly beneath said beam, members on opposite sides of said beam movably supporting said dynamo in position, a belt for driving said dynamo from an axle, and means for adjusting the tension of said belt.

ALEXANDER McGARY.
JOHN W. JEPSON.

Witnesses:
 WM. P. HAMMOND,
 H. C. WORKMAN.